(12) United States Patent
Buck, Jr.

(10) Patent No.: US 11,057,116 B1
(45) Date of Patent: Jul. 6, 2021

(54) OPTICAL ORBITAL ANGULAR MOMENTUM FOR REMOTE SENSING AND COMMUNICATION

(71) Applicant: LOCKHEED MARTIN CORPORATION, Bethesda, MD (US)

(72) Inventor: Joseph Robert Buck, Jr., Superior, CO (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 0 days.

(21) Appl. No.: 16/889,714

(22) Filed: Jun. 1, 2020

(51) Int. Cl.
*H04B 10/00* (2013.01)
*H04B 10/516* (2013.01)
*H04N 7/22* (2006.01)
*H04J 14/00* (2006.01)

(52) U.S. Cl.
CPC ............. *H04B 10/516* (2013.01); *H04N 7/22* (2013.01)

(58) Field of Classification Search
CPC .............................. H04B 10/50; H04B 10/516
See application file for complete search history.

(56) References Cited

U.S. PATENT DOCUMENTS

| | | | |
|---|---|---|---|
| 10,581,522 B1 * | 3/2020 | Innes | H04B 10/1123 |
| 2016/0202283 A1 * | 7/2016 | Wang | G01S 17/58 |
| | | | 356/28 |

* cited by examiner

*Primary Examiner* — Daniel G Dobson
(74) *Attorney, Agent, or Firm* — Morgan, Lewis & Bockius LLP (57) ABSTRACT

An optical orbital angular momentum (OAM) encoding system includes an optical source configured to generate a source light, an optical OAM encoder configured to encode the source light based on OAM modes to generate an encoded light, and an optical unit configured to direct the encoded light to a target.

17 Claims, 11 Drawing Sheets

OPTICAL ORBITAL ANGULAR MOMENTUM FOR REMOTE SENSING AND COMMUNICATION

STATEMENT REGARDING FEDERALLY SPONSORED RESEARCH OR DEVELOPMENT

Not applicable.

FIELD OF THE INVENTION

The present invention generally relates to remote sensing and, more particularly, to optical orbital angular momentum for remote sensing and communication.

BACKGROUND

Atmospheric turbulence can impact optical beams in remote sensing and optical communication and can impair system performance in a number of ways. For example, turbulence can reduce target illumination efficiency and signal collection from the target. It can also affect the beam pointing and size and can further have phase impacts on coherent signals that can turn into noise added to the signal in a communication system. Also, the background light, for example, daylight, can scatter to the detector and act as an additional noise source. Background light is a limitation for leveraging Geiger mode detectors in many daylight scenarios, making them not practical for many applications, as the background light may saturate the detector.

To mitigate turbulence, the conventional method is to implement an adaptive optical correction to compensate for the atmospheric impacts. The adaptive optical correction may include the use of deformable mirrors, spatial light modulators or other holographic techniques, which may add significant system complexity while having limitations on the regimes of applicability. There are multiple methods of suppressing background light, including optical interferometric bandpass filters (including nested cavities), molecular and atomic absorption windowing and spatial filtering. Orbital angular momentum has been explored by several research groups for increasing communication basis sets as a logical expansion of the quadrature amplitude modulation (QAM) type encoding.

SUMMARY

According to various aspects of the subject technology, methods and configuration for leveraging optical angular momentum for remote sensing and communication are provided. The subject technology exploits orbital angular momentum for reducing background impacts on both communication and remote sensing systems.

In one or more aspects, an optical orbital angular momentum (OAM) encoding system includes an optical source configured to generate a source light and an optical OAM encoder configured to encode the source light based on OAM modes to generate an encoded light. The OAM encoding system further includes an optical unit configured to direct the encoded light to a target.

In other aspects, a remote sensing system based on optical OAM includes an optical source and an optical modulator configured to modulate source light from the optical source with a transmit (TX) signal to generate a modulated signal. The remote sensing system further includes an optical OAM encoder configured to encode the modulated light based on OAM modes to generate an encoded signal, and a telescope configured to direct the encoded signal to a target.

In yet other aspects, a method of OAM encoding includes generating a source light, encoding the light source based on OAM modes to generate an encoded light, and directing the encoded light to a target.

The foregoing has outlined rather broadly the features of the present disclosure so that the following detailed description can be better understood. Additional features and advantages of the disclosure, which form the subject of the claims, will be described hereinafter.

BRIEF DESCRIPTION OF THE DRAWINGS

For a more complete understanding of the present disclosure and the advantages thereof, reference is now made to the following descriptions to be taken in conjunction with the accompanying drawings describing specific aspects of the disclosure, wherein.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

In some aspects of the present technology, methods and configurations for leveraging orbital angular momentum (OAM) for remote sensing and communication are disclosed. The subject technology exploits orbital angular momentum for reducing background impacts on both communication and remote sensing systems. In addition, suitable angular momentum modes can reduce impacts of turbulence on channel efficiency, which allows an order-of-magnitude reduction in the impact of background light. Background light also tends to be a primary system driver for active Geiger mode sensing systems. The disclosed techniques, while offering significant improvement in background light suppression, have minimal system constraints.

The subject technology leverages the advances in spatial light modulators and arbitrary phase screens for generation and filtering of OAM states with modest system design constraints. Specifically, the subject disclosure includes a number of features including encoders for encoding the transmitted optical energy in a set of OAM modes; decoders for receiving and decoding the OAM modes; transmission protocols to reduce impacts of background light on the receiver; a protocol for reducing impacts of turbulence on channel efficiency, optimized for turbulence regime; protocols for optimizing optical sensing channel efficiency for scattering from Lambertian surfaces; a protocol for optimizing channel efficiency for direct-detection remote sensing system; a protocol for optimizing channel efficiency for direct detection optical communication transceiver; and channelization optimization of energy versus bandwidth for both direct and coherent optical communication applications.

Currently, the use of OAM modes for encoding information and for fiber channelization is being investigated. However, the use of OAM modes in applications for optical background suppression and atmospheric turbulence mitigation has not been reported. Direct detection systems may rely on bandpass filters for suppressing background light. In many cases, daytime operation is impractical due to the difficulty of implementing a sufficiently narrow filter. In those cases, this is a primary trade between coherent and direct detection architectures. Encoding using OAM modes provides another method of suppressing background light. The OAM modes also provide another basis set for reducing the impacts of turbulence on the channel efficiency for both remote sensing and communication.

Figure 1A:
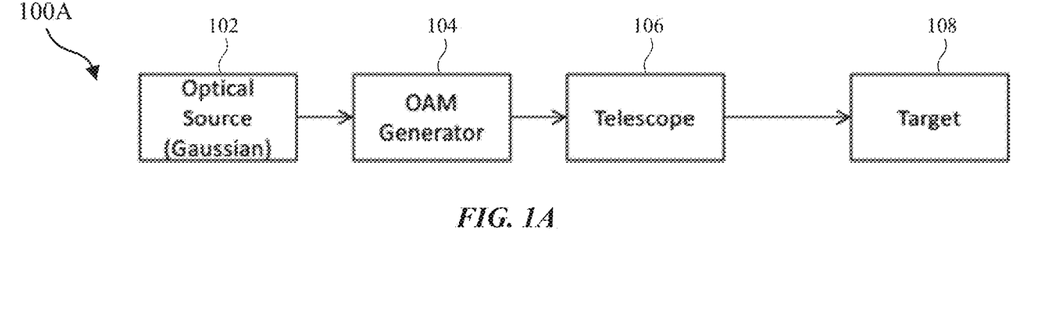
FIGS. 1A, 1B, 1C and 1D are schematic diagrams illustrating examples of system architectures for encoding transmission energy in a set of orbital angular momentum (OAM) modes, according to certain aspects of the disclosure.

FIGS. 1A, 1B, 1C and 1D are schematic diagrams illustrating examples of system architectures for encoding transmission energy in a set of OAM modes, according to certain aspects of the disclosure. FIG. 1A shows a high-level system architecture 100A for encoding transmission energy in a set of OAM modes. The high-level system architecture 100A includes an optical source 102, an OAM generator 104, a telescope 106 and a target 108. The optical source 102 is a light source, with examples including a laser diode, fiber laser, super-luminescent LED, or LED. The OAM generator 104 generates patterns based on OAM modes and can be a single-phase plate, a phase spatial-light modulator with a vortex phase pattern, or an amplitude spatial-light modulator with an amplitude-to-phase optical conversion relay. In all cases the generated patterns can be binary or greyscale. The amplitude spatial-light modulator can be either a microelectromechanical system (MEMS) mirror array or a liquid crystal spatial-light modulator. The OAM generator 104 may be controlled by a pattern controller for the spatial-light modulators that can be a separate interface (not shown for simplicity) or combined with a processor of the system such as a general-purpose processor. The telescope 106 can be a single lens or a lens system that directs the modulated light to the target, so that the pattern is scaled to the desired size and in focus at the target 108.

Figure 1B:
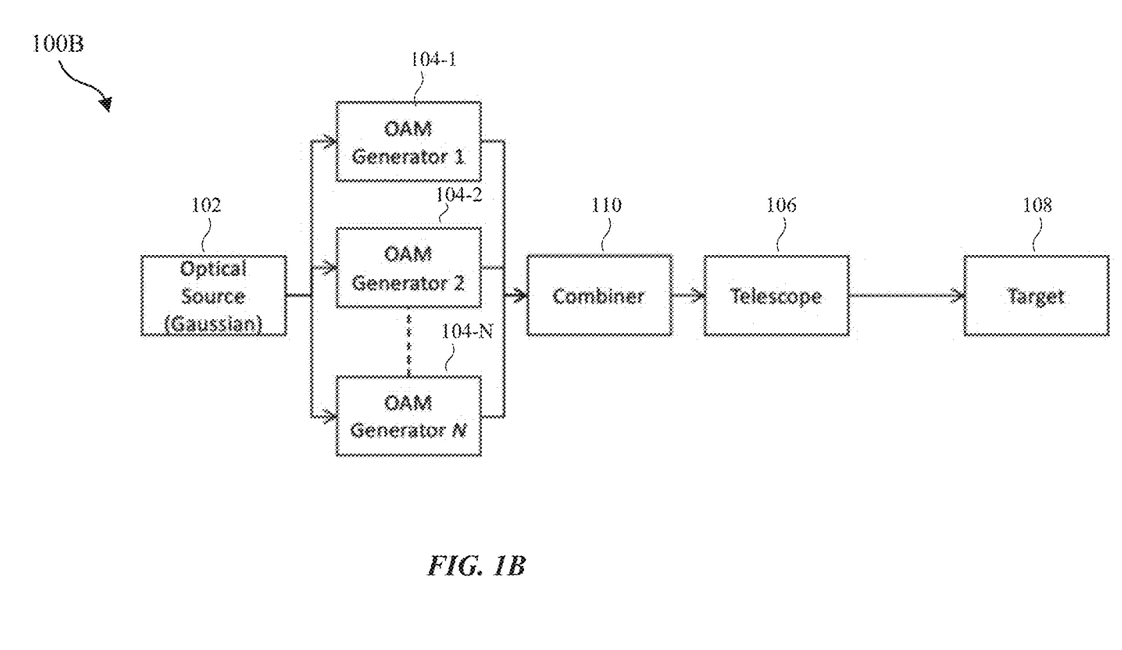

FIG. 1B shows a system architecture 100B that is similar to the system architecture 100A except for OAM generator 104, which is split into multiple OAM generators 104-1 through 104-N, and the addition of a combiner 110 that recombines the modulated lights from the multiple OAM generators 104-1 through 104-N into a single transmitted beam. Each OAM generator of the multiple OAM generators 104-1 through 104-N can be controlled separately and can encode or modulate the light from the optical source 102 based on a different configuration of OAM modes.

Figure 1C:
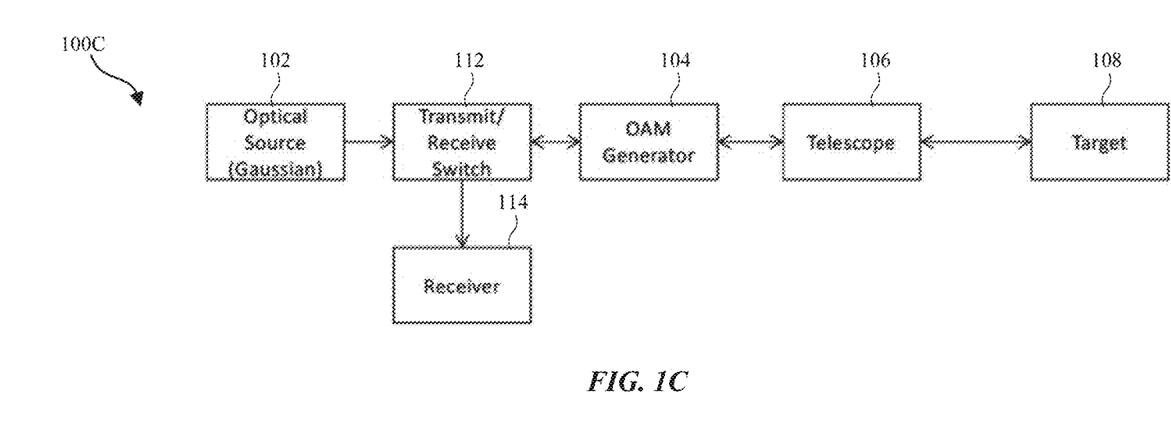

FIG. 1C shows a system architecture 100C that includes both transmit (TX) and receive (RX) paths. The system architecture 100C includes the optical source 102, a transmit/receive switch 112, the OAM generator 104, the telescope 106, the target 108 and the receiver 114. The OAM generator 104 and the telescope 106 are used for the TX beam and the RX beam, each of which is scattered from the target 108. In other words, the OAM generator 104 functions both as a modulator (encoder) for the TX beam and as a spatial filter for the RX beam. The transmit/receive switch 112 can transmit the TX beam to the OAM generator 104 for modulation and direct the filtered RX beam from the OAM generator 104 to the receiver 114. The receiver 114 includes a detector that converts the filtered RX beam into an electrical signal, which can be amplified, digitized and processed to recover an image or a desired remote sensing signal associated with the target 108.

Figure 1D:
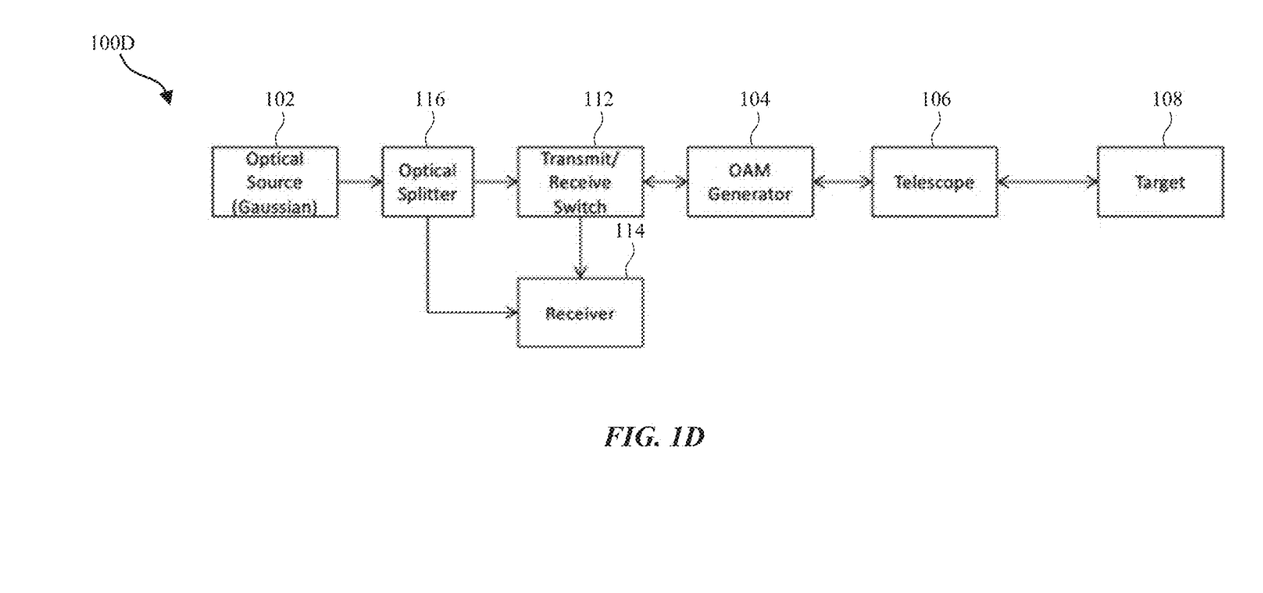

FIG. 1D shows a system architecture 100D that is similar to the system architecture 100C except for an additional optical splitter 116, which branches out a portion of the optical beam from the optical source 102 into the receiver 114 to adapt it for use as a coherent detection configuration.

Figure 2A:
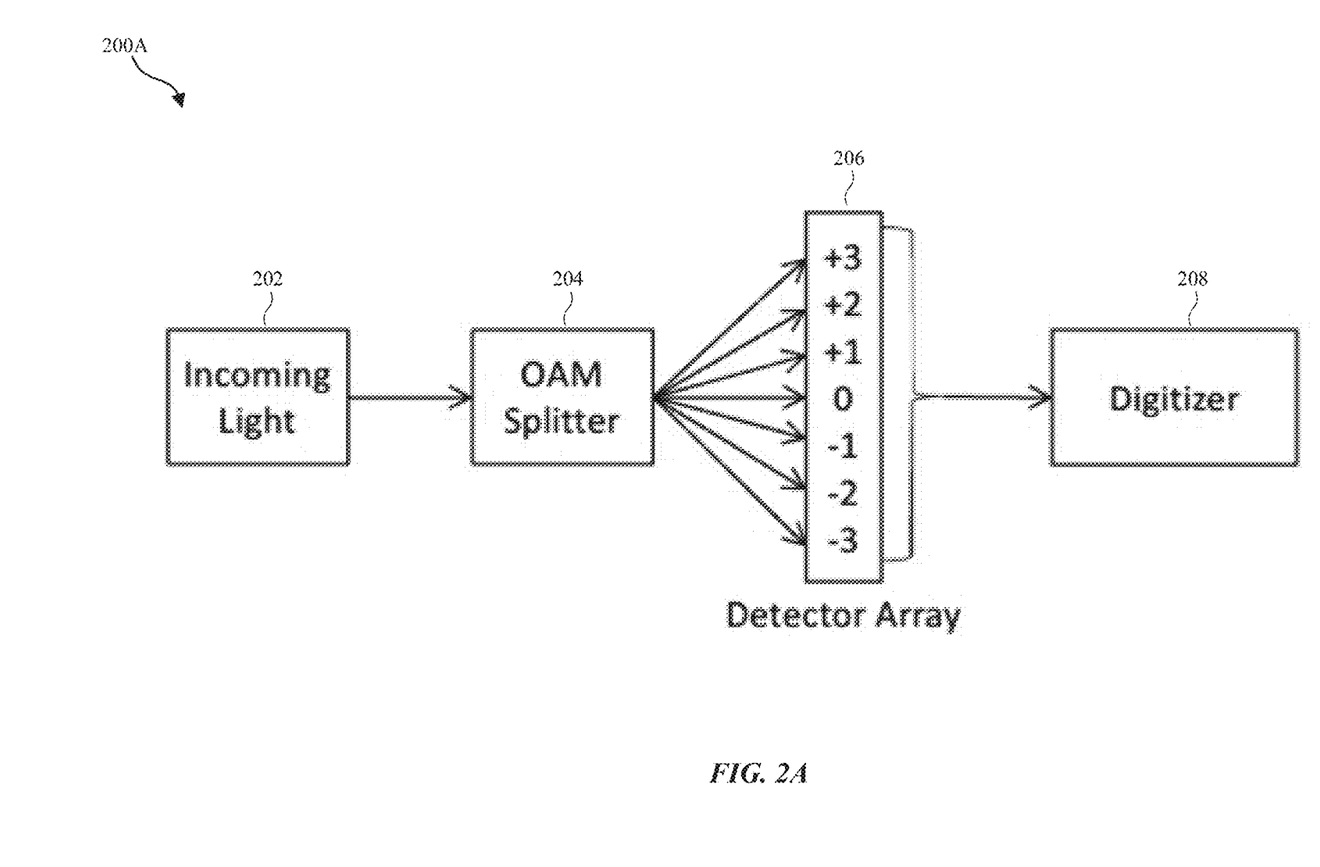
FIGS. 2A, 2B and 2C are schematic diagrams illustrating examples of system architectures of a receiver for decoding the OAM modes, according to certain aspects of the disclosure.
Figure 2B:
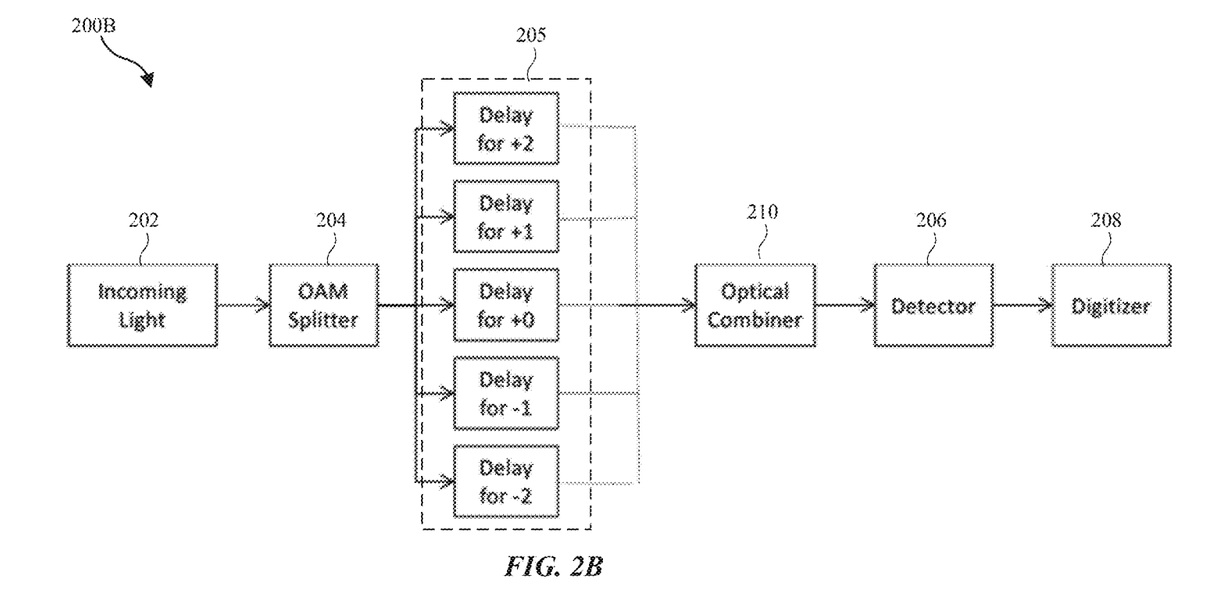
Figure 2C:
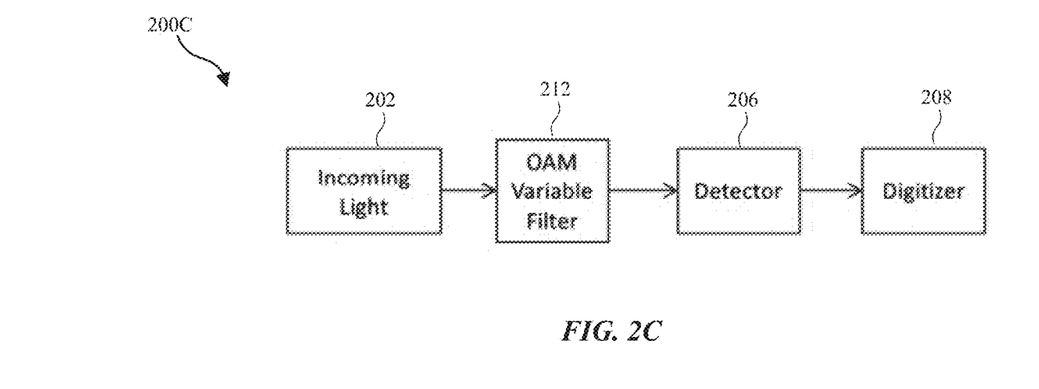

FIGS. 2A, 2B and 2C are schematic diagrams illustrating examples of system architectures of a receiver for decoding the OAM modes, according to certain aspects of the disclosure.

FIG. 2A is a system architecture 200A that includes an incoming light 202, an OAM splitter 204, a detector array 206 and a digitizer 208. The incoming light 202 to the receiver is split by the OAM splitter 204 into one or more spatial modes corresponding to the topological orders of the vortex modes. In this way, more than one mode can be measured simultaneously by the detector array 206, which can detect vortex modes (e.g., +3, +2, +1, 0, −1, −2 and −3) to generate corresponding electrical signals, which are converted to digital signals by the digitizer 208 for processing by a processor.

FIG. 2B is a system architecture 200B that shows the adaptation of the system architecture 200A to measure multiple modes that are multiplexed in time. The system architecture 200B includes the incoming light 202, the OAM splitter 204, a delay block 205, an optical combiner 210, the detector 206 and the digitizer 208. For a pulsed optical signal, each delay element of the delay block 205 shifts the mode by at least a pulse duration (e.g., +2, +1, 0, −1 and −2) with respect to the adjacent mode. The number of modes that can be accommodated is limited by the pulse-to-pulse duration. In this way, a single receiver can be used to measure multiple vortex modes within a pulse.

FIG. 2C is a system architecture 200C that shows the configuration with a single OAM filter. The system architecture 200C includes the incoming light 202, an OAM variable filter 212, the detector 206 and the digitizer 208. The OAM variable filter 212 can be a static filter or a dynamic filter that can be changed from pulse to pulse or to match the transmitted configuration or to pick a single optimized mode.

Figure 3A:
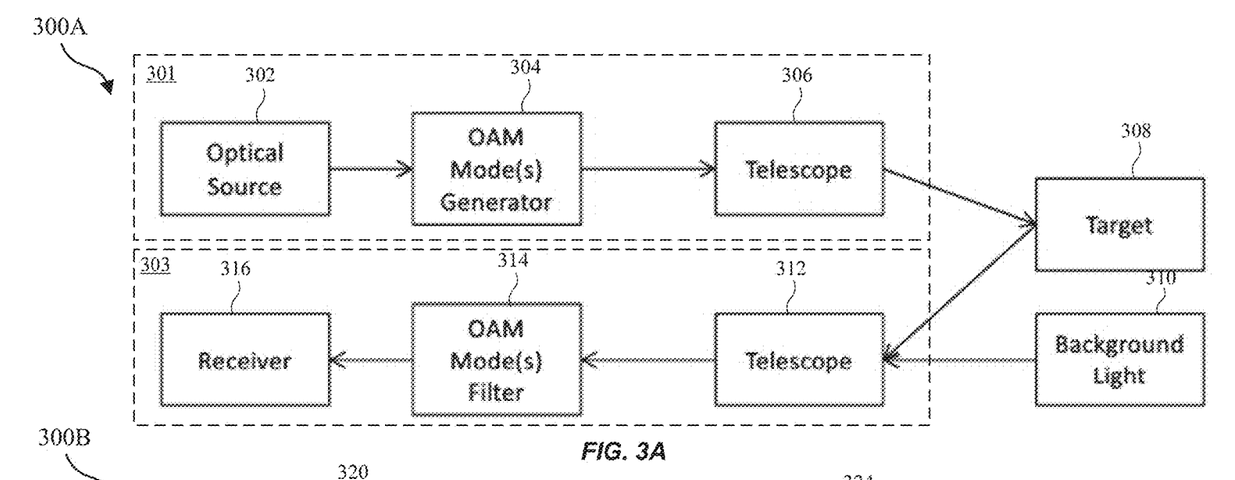
FIGS. 3A and 3B are a schematic diagram and a flow diagram, respectively, illustrating an example of a system architecture and a transmission protocol for reducing impacts of background light on a receiver, according to certain aspects of the disclosure.
Figure 3B:
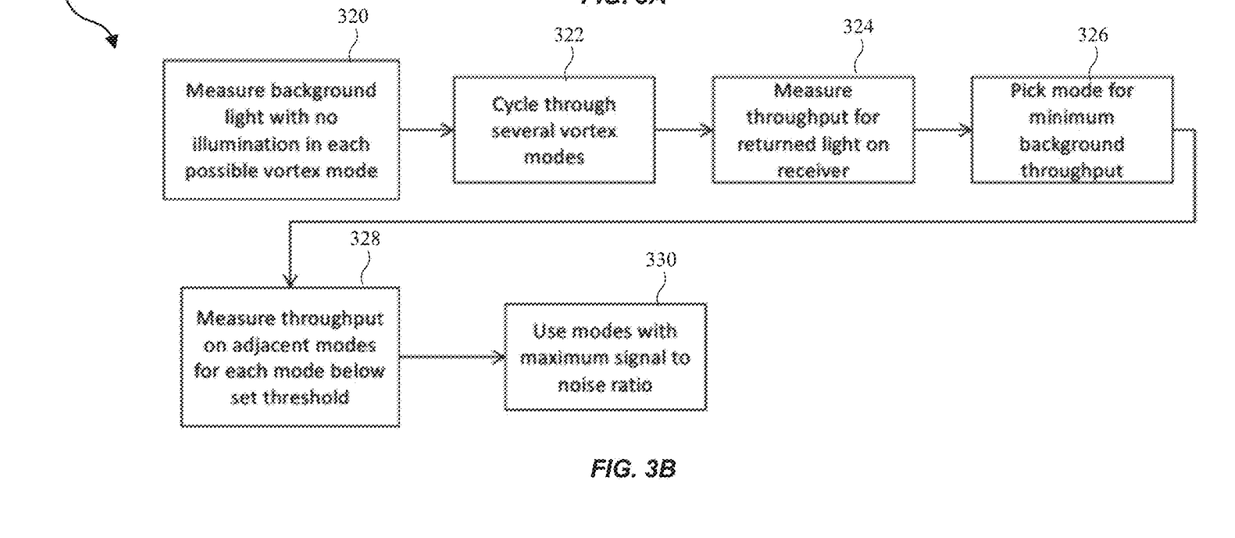

FIGS. 3A and 3B are a schematic diagram and a flow diagram, respectively, illustrating an example of a system architecture and a transmission protocol for reducing impacts of background light on a receiver, according to certain aspects of the disclosure.

FIG. 3A is a system architecture 300A for suppressing background light. The system architecture 300A includes a TX path 301, including an optical source 302, an OAM mode(s) generator 304 and a TX telescope 306, and an RX path, including an RX telescope 312, an OAM mode(s) filter 314 and a receiver 316. The optical source 302, the OAM mode(s) generator 304 and the TX telescope 306 are similar to optical source 102, the OAM generator 104 and the telescope 106 of FIG. 1A. The RX telescope 312, the OAM mode(s) filter 314 and the receiver 316 are similar to the telescope 106, OAM generator 104 and receiver 114 of FIG. 1D. The receiver 316 receives both the scattered light from a target 308, which is illuminated by the light from the TX telescope 306, and a background (e.g., solar radiation) light 310. The OAM mode(s) generator 304 transmits an OAM vortex mode that is chosen to both optimize fluence on the target 308 and minimize the background light within the receiver path 303. The OAM mode(s) filter 314 can select the OAM vortex modes that match the transmitted OAM vortex modes, or select other channels that are optimum for either the received light or background suppression. The optimum channel is selected based on the entire system noise sources to maximize signal-to-noise ratio (SNR).

FIG. 3B is a protocol 300B for optimizing the SNR and starts at operation block 320, where the background light 310 is measured with no illumination of the target 308 in each possible vortex mode from the TX path 301. At operation block 322, several vortex modes are cycled through. At operation block 324, measurements are made of the throughput for the return light (scattered light from the target 308) on the receiver 316. At operation block 326, the OAM mode filter(s) 314 selects modes for minimum background throughput. At operation block 328, throughput measurements are made for adjacent modes for each mode below a set threshold. At operation block 330, vortex modes with maximum SNR are used for signal recovery.

Figure 4A:
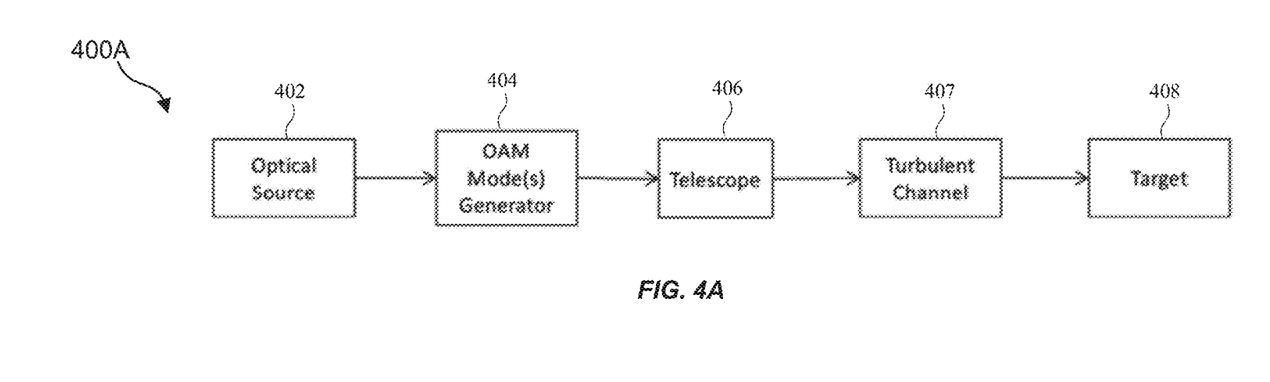
FIGS. 4A, 4B and 4C are schematic diagrams and a flow diagram respectively illustrating examples of system architectures and a protocol for reducing impacts of turbulence on channel efficiency, according to certain aspects of the disclosure.
Figure 4B:
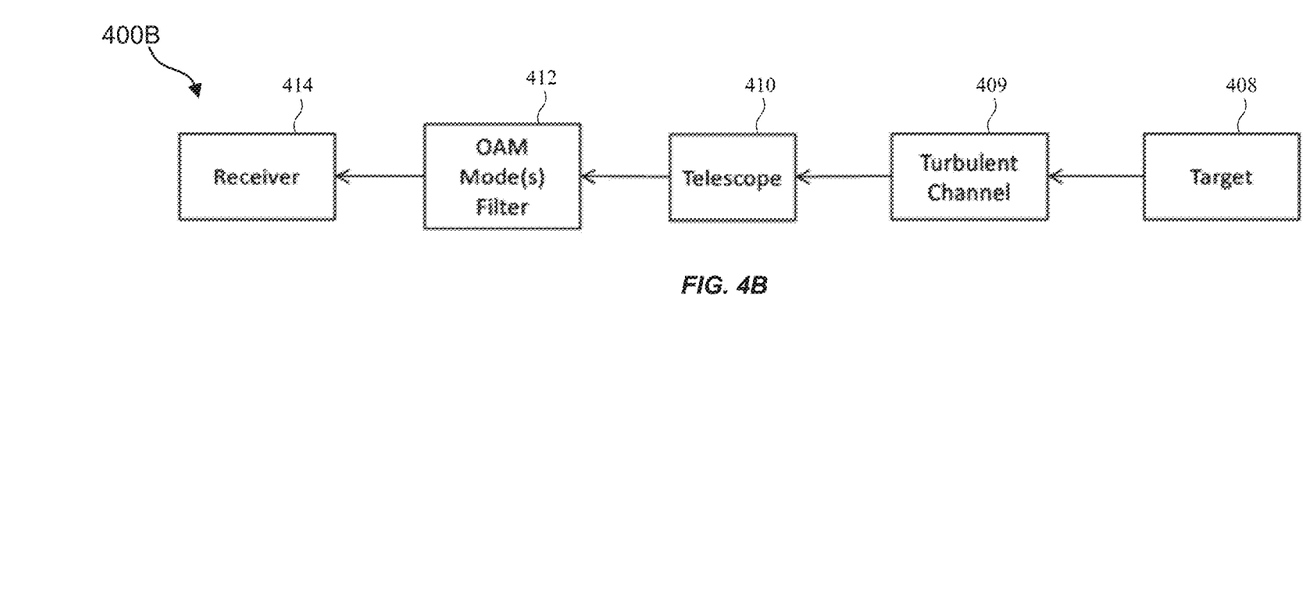
Figure 4C:
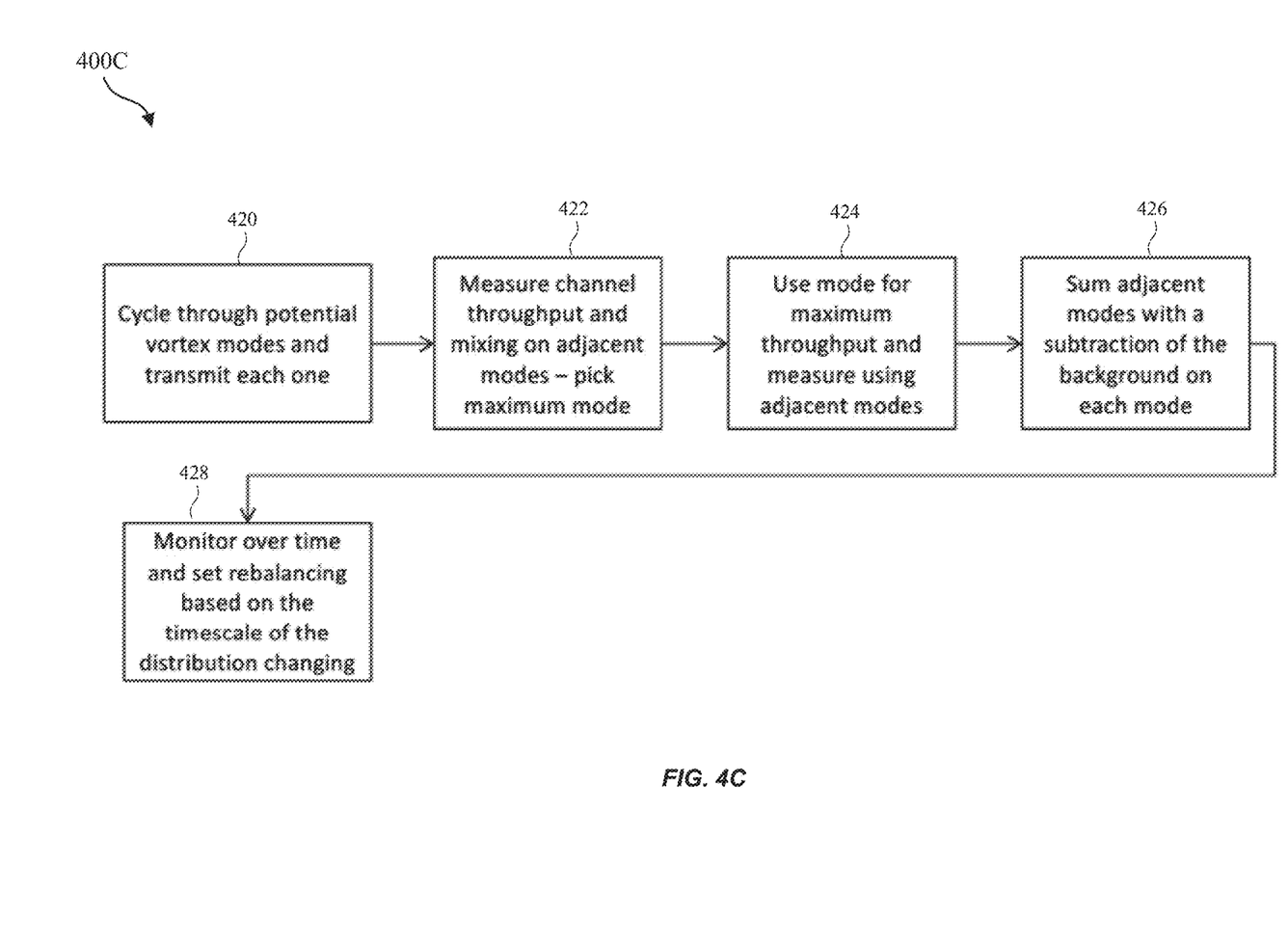

FIGS. 4A, 4B and 4C are schematic diagrams and a flow diagram, respectively, illustrating examples of system architectures and a protocol for reducing impacts of turbulence on channel efficiency, according to certain aspects of the disclosure.

FIG. 4A is a system architecture 400A for optimizing the fluence on a target in the presence of a turbulent channel. The system architecture 400A includes an optical source 402, an OAM mode(s) generator 404, a telescope 406, a turbulent channel 407 and a target 408. The optical source 402, the OAM mode(s) generator 404 and the telescope 406 are similar to the optical source 302, the OAM mode(s) generator 304 and the telescope 306 of FIG. 3A. The turbulent channel 407 is the optical communication channel (of the TX path) affected by the atmospheric turbulence that affects the light output of the telescope 406.

FIG. 4B is a system architecture 400B for optimizing the throughput through a turbulent channel 409 for the return light from the target 408 and includes the target 408, the turbulent channel 409, a telescope 410, an OAM mode(s) filter 412 and a receiver 414. The telescope 410, the OAM mode(s) filter 412 and the receiver 414 are similar to the telescope 312, the OAM mode(s) filter 314 and the receiver 316 of FIG. 3A. The turbulent channel 409 is the turbulence generated by the atmospheric turbulence in the RX path. The OAM mode(s) filter 412 can select the optimum channel that is jointly optimized with the system architecture 400A for the transmitted light and can reduce effects of the turbulence from the TX and RX paths.

FIG. 4C is a protocol 400C for maximizing the SNR for the case of a turbulent channel. The protocol 400C starts at operation block 420, where the OAM mode(s) generator 404 cycles through potential vortex modes for transmission to the target 408. At operation block 422, the receiver 414 measures channel throughput and mixings on adjacent channel modes to select the optimum mode. At operation block 424, the mode with the maximum throughput is used and adjacent modes are measured. At operation block 426, the background is subtracted from each adjacent mode and the results are summed. At operation block 428, the throughputs are monitored over time and a rebalancing is set based on the timescale of the turbulent channel distribution changing.

Figure 5:
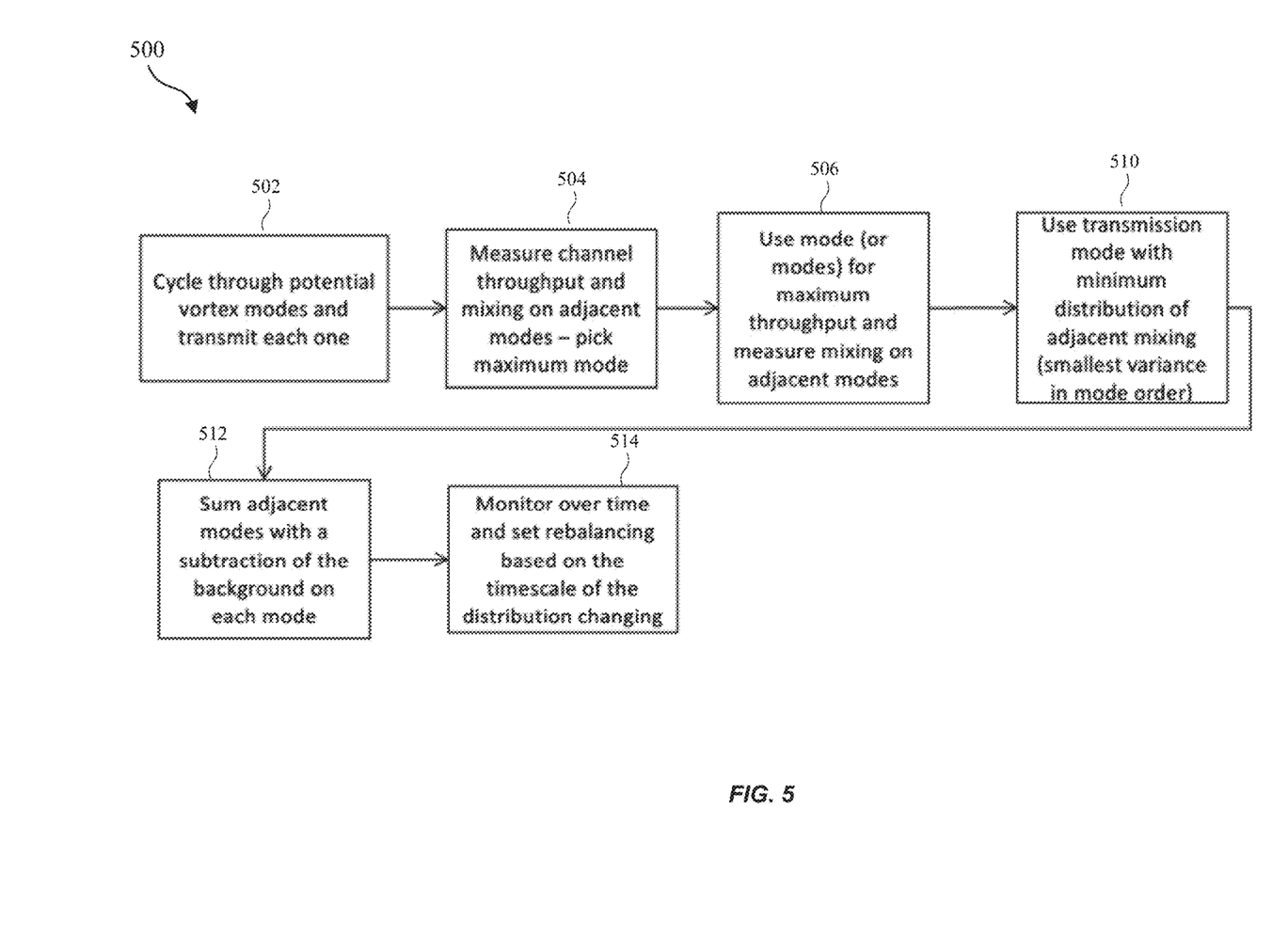
FIG. 5 is a flow diagram illustrating an example of a protocol for optimizing optical sensing channel efficiency for scattering from a Lambertian surface and for direct-detection remote sensing, according to certain aspects of the disclosure.

FIG. 5 is a flow diagram illustrating an example of a protocol 500 for optimizing optical sensing channel efficiency for scattering from a Lambertian surface and for direct-detection remote sensing, according to certain aspects of the disclosure. The protocol 500 can be implemented by the system architectures 400A and 400B of FIGS. 4A and 4B. The protocol 500 starts at operation block 502, where the potential vortex modes are cycled through and transmitted to the target. At operation block 504, channel throughput and mixing on adjacent modes is measured to select the vortex mode with the maximum throughput. At operation block 506, the vortex mode or modes with maximum throughput are used and mixing on adjacent channels is measured. At operation block 510, the transmission vortex mode with minimum distribution of adjacent channel mixing (smallest variance in vortex mode order) is used. At operation block 512, the background is subtracted from throughput associated with each vortex mode and the results are summed together. At operation block 514, the throughputs are monitored over time and a rebalancing is set based on the timescale of the turbulent channel distribution changing. The protocol 500 can also be applied for optimizing channel efficiency for direct-detection remote sensing system (e.g., system architecture 100C of FIG. 1C).

Figure 6:
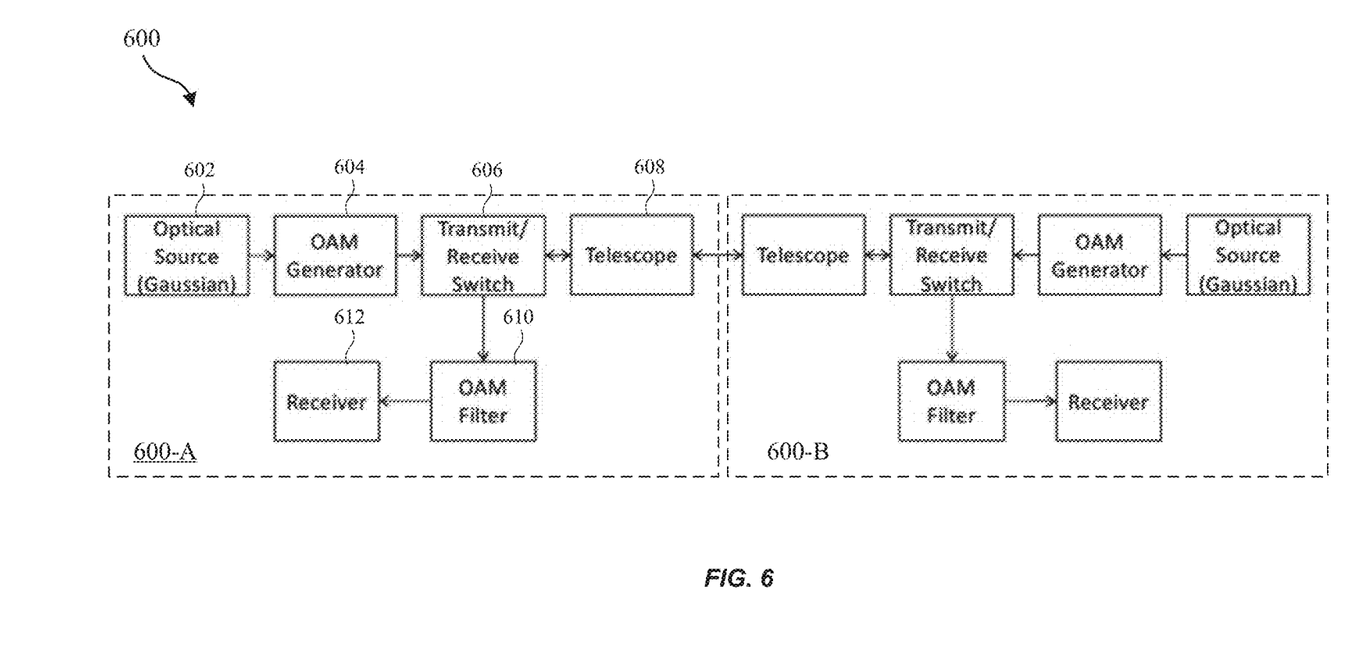
FIG. 6 is a schematic diagram illustrating an example of a system architecture for a two-way communication system, according to certain aspects of the disclosure.

FIG. 6 is a schematic diagram illustrating an example of a system architecture 600 for a two-way communication system, according to certain aspects of the disclosure. The system architecture 600 can be used to implement the protocol 500 of FIG. 5 for optimizing channel efficiency for direct detection optical communication, as well as for channelization optimization of energy versus bandwidth for both direct and coherent optical communication applications.

The system architecture 600 is a two-way optical communication system and includes two identical subsystems 600A and 600B, each including an optical source 602, an OAM generator 604, a transmit/receive switch 606, a telescope 608, an OAM filter 610 and a receiver 612. The optical source 602, the OAM generator 604, the transmit/receive switch 606, the telescope 608 and the receiver 612 are similar to the optical source 102, the OAM generator 104, the transmit/receive switch 112, the telescope 106 and the receiver 114 of FIG. 1C. The OAM filter 610 is similar to the OAM mode(s) filter 314 of FIG. 3A. The system architecture 600 allows for separate mode selection for transmit and receive path, as well as different modes from the subsystem 600A versus the subsystem 600B. This would allow a reduction of cross-talk from other scattering. In some implementations, the system architecture 600 can be simplified by using a single OAM filter 610 common to the transmit and receive paths. In other words, the OAM filter 610 and the OAM generator 604 can be implemented as a common block similar to the OAM generator 104 of FIG. 1D.

Figure 7:
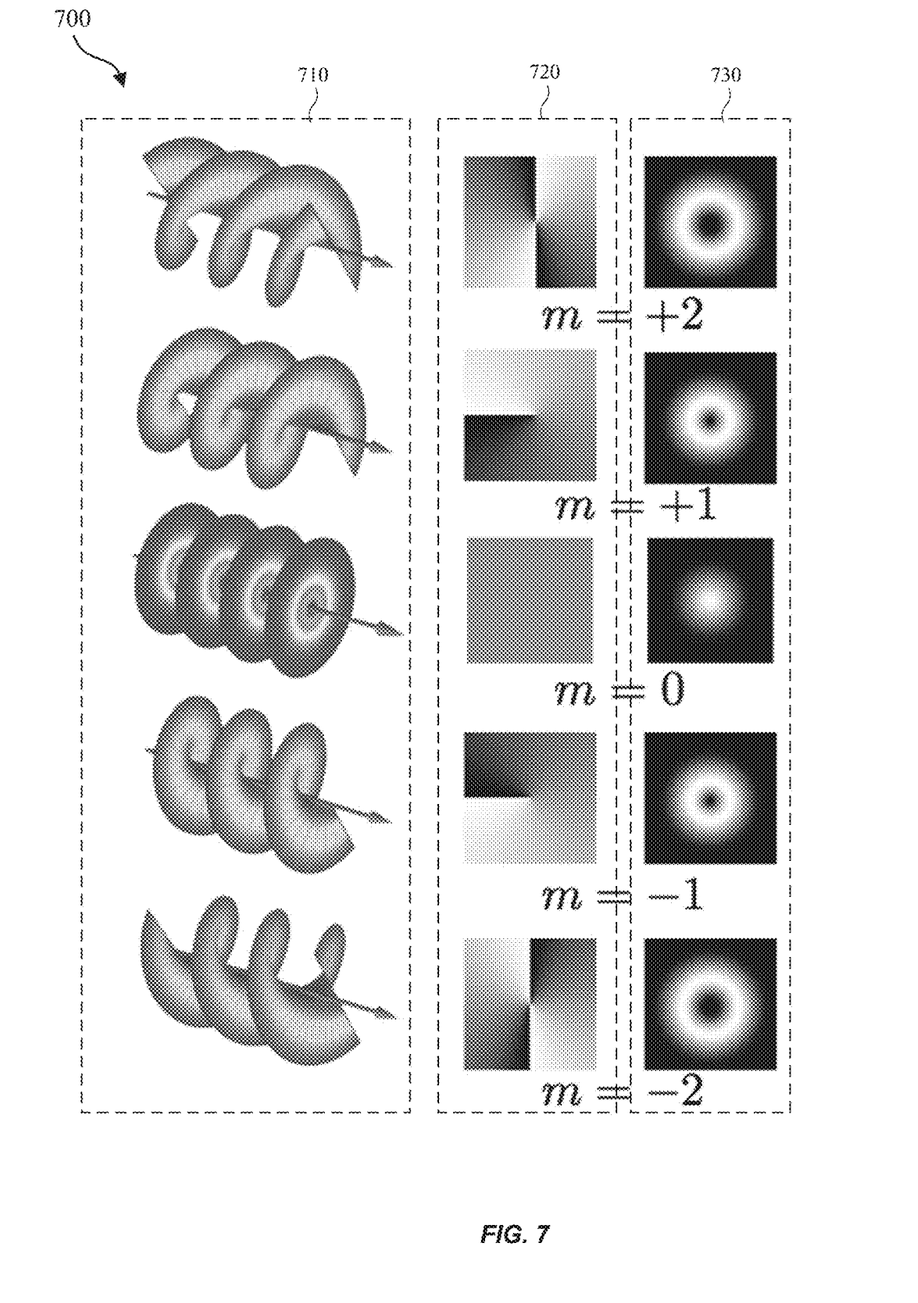
FIG. 7 is a schematic diagram illustrating an example of OAM states serving as an orthogonal basis set for the OAM communication and remote sensing of the subject technology.

FIG. 7 is a schematic diagram illustrating a plot 700 of an example of OAM states serving as an orthogonal basis set for the OAM communication and remote sensing of the subject technology. The plot 700 depicts helical structures 710, phase-front profiles 720 and intensity profiles 730 of a light beam. In the helical structures 710, the light beam is twisted similar to a corkscrew around an axis of travel, and due to the twisting, the light waves can cancel each other out at the axis and generate an optical vortex. The optical vortex, also known as a photonic quantum vortex, screw dislocation or phase singularity, is a zero of an optical field, which is a point of zero light intensity. The spinning induces a torque on an electric dipole, and thus carries an OAM with the wave train. The OAM of light can be observed in the torque imparted to an atom in a field-carrying OAM and is different from the spin angular momentum, which is responsible for circular polarization.

The helical structures 710 correspond to OAM values of m=+2, m=+1, m=0, m=−1, and m=−2. The OAM value is always an integer, and can be positive or negative, depending on the direction of the twist. The higher the number of the twist, the faster the light is spinning around the axis. The phase-front profiles 720 correspond to the helical structures 710 and show five different states associated with OAM values of m=+2, m=+1, m=0, m=−1, and m=−2. The intensity profiles 730 also depict five different states associated with OAM values of m=+2, m=+1, m=0, m=−1, and m=−2, of which four states (m=+2, m=+1, m=−1, and m=−2) represent optical vortices and have dark spots in the middle that represent zero optical field. The subject technology leverages the OAM states as an orthogonal basis set for OAM communication and remote sensing, as described above.

Figure 8:
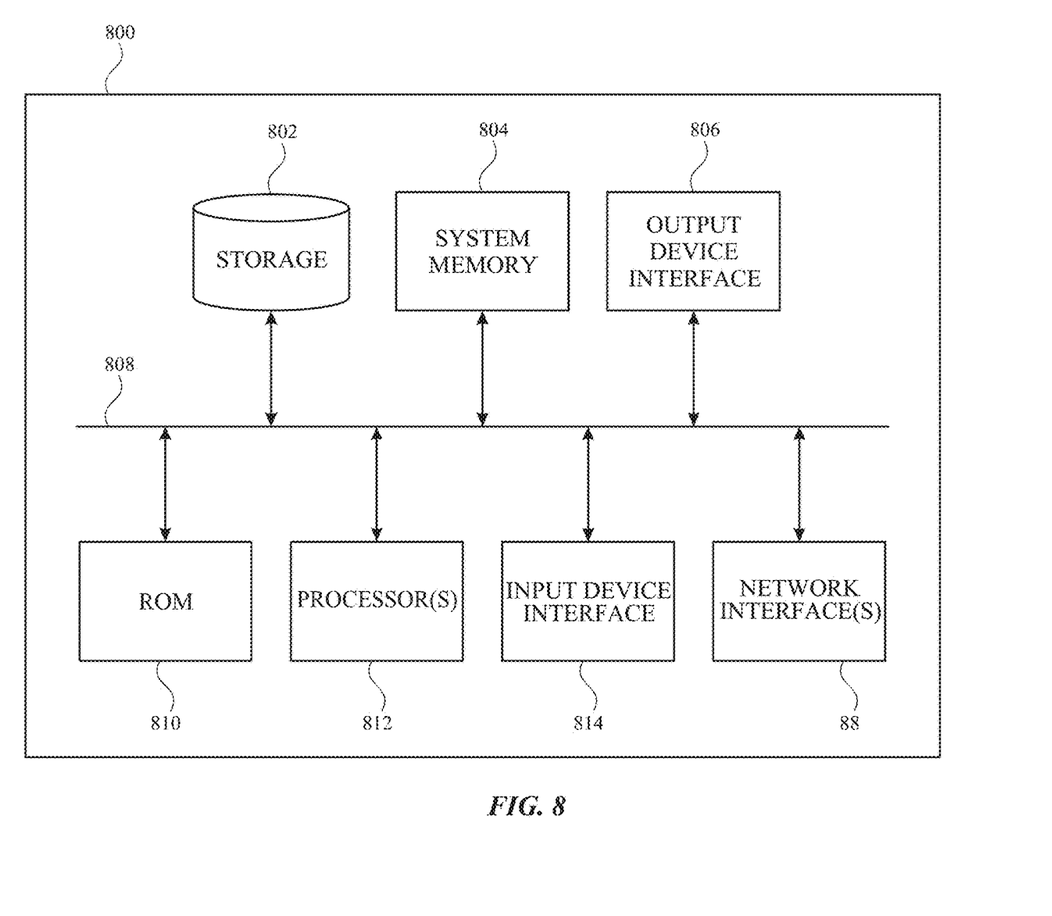
FIG. 8 conceptually illustrates an electronic system with which some aspects of the subject technology are implemented.

FIG. 8 conceptually illustrates an electronic system with which some aspects of the subject technology are implemented. Electronic system 800, for example, can be a desktop computer, a laptop computer, a tablet computer, a server, a switch, a router, a base station, a receiver, a phone, a personal digital assistant, any device that can control and/or perform processing of data including aggregation of data, or generally any electronic device that transmits signals over a network. Such an electronic system includes various types of computer-readable media and interfaces for various other types of computer-readable media. Electronic system 800 includes bus 808, processing unit(s) 812, system memory 804, read-only memory (ROM) 810, permanent storage device 802, input device interface 814, output device interface 806, and network interface 816, or subsets and variations thereof.

Bus 808 collectively represents all system, peripheral, and chipset buses that communicatively connect the numerous internal devices of electronic system 800. In one or more implementations, bus 808 communicatively connects processing unit(s) 812 with ROM 810, system memory 804, and permanent storage device 802. From these various memory units, processing unit(s) 812 retrieve(s) instructions to execute and data to process in order to execute the processes of the subject disclosure. The processing unit(s) 812 can be a single processor or a multicore processor in different implementations.

ROM 810 stores static data and instructions that are needed by processing unit(s) 812 and other modules of the electronic system. Permanent storage device 802, on the other hand, is a read-and-write memory device. This device is a nonvolatile memory unit that stores instructions and data even when electronic system 800 is off. One or more implementations of the subject disclosure use a mass-storage device (such as a magnetic or optical disk and its corresponding disk drive) as permanent storage device 802.

Other implementations use a removable storage device (such as a floppy disk or flash drive, and its corresponding disk drive) as permanent storage device 802. Like permanent storage device 802, system memory 804 is a read-and-write memory device. However, unlike storage device 802, system memory 804 is a volatile read-and-write memory, such as random access memory (RAM). System memory 804 stores any of the instructions and data that processing unit(s) 812 need(s) at runtime. In one or more implementations, the processes of the subject disclosure, for example, the trained ROM, are stored in system memory 804, permanent storage device 802, and/or ROM 810. From these various memory units, processing unit(s) 812 retrieve(s) instructions to execute and data to process in order to execute the processes of one or more implementations. In one or more implementations, the processing unit(s) 812 may at least partially execute the methods and protocols of the subject technology, for example, the protocols of FIGS. 3B, 4C, and 5.

Bus 808 also connects to input and output device interfaces 814 and 806. Input device interface 814 enables a user to communicate information and select commands to the electronic system. Input devices used with input device interface 814 include, for example, alphanumeric keyboards and pointing devices (also called "cursor control devices"). Output device interface 806 enables, for example, the display of images generated by electronic system 800. Output devices used with output device interface 806 include, for example, printers and display devices such as a liquid-crystal display (LCD), a light-emitting diode (LED) display, an organic light-emitting diode (OLED) display, a flexible display, a flat-panel display, a solid-state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback, and input from the user can be received in any form, including acoustic, speech, or tactile input.

Finally, as shown in FIG. 8, bus 808 also couples electronic system 800 to a network (not shown) through network interface 816. In this manner, the computer can be a part of a network of computers (such as a local area network (LAN), a wide area network (WAN), or an intranet, or a network of networks, such as the Internet). Any or all components of electronic system 800 can be used in conjunction with the subject disclosure.

In some aspects, the subject technology is related to methods and configurations for leveraging OAM for remote sensing and communication. In some other aspects, the subject technology may be used in various markets, including, for example, and without limitation, remote sensing technology, signal processing and communication markets.

Those of skill in the art would appreciate that the various illustrative blocks, modules, elements, components, methods, and algorithms described herein may be implemented as electronic hardware, computer software or a combination of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks may be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single hardware and software product or packaged into multiple hardware and software products.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meanings unless otherwise explicitly and clearly defined by the patentee. If there is any conflict in the usage of a word or term in this specification and one or more patent or other documents that may be incorporated herein by reference, the definition that is consistent with this specification should be adopted.

What is claimed is:

1. An optical orbital angular momentum (OAM) encoding system, the system comprising:
    an optical source configured to generate a source light;
    an optical OAM encoder configured to encode the source light based on OAM modes to generate an encoded light, wherein the optical OAM encoder comprises a plurality of OAM encoders, wherein each of the plurality of OAM encoders is controlled separately and is configured to encode or modulate the source light based on a different configuration of the OAM modes; and
    an optical unit configured to direct the encoded light to a target.

2. The system of claim 1, further comprising a receiver configured to receive scattered light from the target and recover an image of the target.

3. The system of claim 1, wherein the optical OAM encoder comprises a single-phase plate, a phase spatial-light modulator or an amplitude spatial-light modulator.

4. The system of claim 3, wherein the phase spatial-light modulator is configured to generate a vortex phase pattern based on the OAM modes, wherein the vortex phase pattern is generated in binary or greyscale.

5. The system of claim 4, wherein the amplitude spatial-light modulator is configured to perform an amplitude-to-phase optical conversion based on the OAM modes.

6. The system of claim 1, further comprising a combiner configured to combine encoded source lights from the plurality of OAM encoders and to direct a combined encoded light to the optical unit, and wherein the optical unit comprises an optical telescope including a lens system.

7. A remote sensing system based on optical OAM, the system comprising:
    an optical source;
    an optical modulator configured to modulate source light from the optical source with a transmit (TX) signal to generate a modulated signal;
    an optical OAM encoder configured to encode the modulated light based on OAM modes to generate an encoded signal; and
    a telescope configured to direct the encoded signal to a target, wherein the telescope is configured to receive a return signal from the target and to direct the return signal to an optical OAM filter, wherein the optical OAM filter is integrated with the optical OAM encoder.

8. The system of claim 7, wherein the optical OAM filter comprises a single-phase plate, a phase spatial-light demodulator or an amplitude spatial-light demodulator.

9. The system of claim 7, further comprising a TX/receive (RX) switch configured to direct an OAM-filtered return signal to a receiver.

10. The system of claim 9, wherein the receiver comprises a coherent receiver, and wherein the system further comprises an optical splitter configured to receive and split the source light and branch out a portion of the source light to the coherent receiver.

11. The system of claim 7, further comprising a receiver comprising an OAM splitter, a detector array and a digitizer, wherein the OAM splitter is configured to split received light into a plurality of spatial modes corresponding to topological orders of the OAM modes.

12. The system of claim 11, wherein the detector array comprises a plurality of delays, an optical combiner and an optical detector, and wherein the receiver comprises an OAM variable filter and the optical detector.

13. The system of claim 11, wherein a light output of the telescope is affected by a TX turbulent channel due to atmospheric turbulence in a TX path.

14. The system of claim 13, wherein a return light from the target is affected by an RX turbulent channel due to atmospheric turbulence in an RX path, and wherein the receiver comprises an OAM modes filter configured to reduce effects of an atmospheric turbulence from the TX and RX paths.

15. A method comprising:
generating a source light;
encoding the light source based on OAM modes to generate an encoded light;
directing the encoded light to a target; and
applying a transmission protocol to reduce impact of background light on a receiver and to reduce an effect of a turbulence on a channel efficiency, the transmission protocol being optimized to a turbulence regime.

16. The method of claim 15, further comprising receiving return light from the target and decoding the return light to recover a target image.

17. The method of claim 15, further comprising:
applying a first protocol for optimizing an optical sensing channel efficiency for a Lambertian-surface target;
applying a second protocol for optimizing channel efficiency for direct-detection remote sensing;
applying a third protocol for optimizing channel efficiency for a direct-detection optical communication transceiver; and
applying a fourth protocol for channelization optimization of energy versus bandwidth for direct and coherent optical communication applications.

* * * * *